United States Patent
Kang et al.

(10) Patent No.: US 7,346,446 B2
(45) Date of Patent: Mar. 18, 2008

(54) FUEL REFORMING ESTIMATION IN HCCI ENGINES

(75) Inventors: Jun-Mo Kang, Ann Arbor, MI (US); Chen-Fang Chang, Troy, MI (US); Tang-Wei Kuo, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/538,082

(22) Filed: Oct. 3, 2006

(65) Prior Publication Data

US 2007/0124055 A1    May 31, 2007

Related U.S. Application Data

(60) Provisional application No. 60/724,191, filed on Oct. 6, 2005.

(51) Int. Cl.
*F02M 27/02* (2006.01)
(52) U.S. Cl. ............... 701/108; 123/3; 123/568.21
(58) Field of Classification Search ............... 701/108, 701/109, 103, 104, 105; 123/3, 568.21
See application file for complete search history.

(56) References Cited

U.S. PATENT DOCUMENTS 7,159,541 B2 *  1/2007  Wakao et al. ............ 123/3

2006/0196467 A1   9/2006  Kang

OTHER PUBLICATIONS

"Universal Air-Fuel Ratio Heated Exhaust Gas Oxygen Sensor and Further Applictions", T. Yamada, N. Hayakawa, Y. Kami, and T. Kawai, SAE paper 920234.
"Interactions Between Exhaust Gas Composition and Oxygen Sensor Performance", J.G. Buglass, T.D.B. Morgan, J.O. Graupner, SAE paper 922646.
"Intake Oxygen Concentration Estimation for DI Diesel Engines", Diop, S.; Moraal, P.E., Kolmanovsky, I.V., and VanNieuwstadt, M., Proceedings of the 1999 IEEE International Conference on Control Applications, Aug. 22-27, 1999, pp. 852-857 vol. 1.

* cited by examiner

*Primary Examiner*—Hieu T. Vo

(57) ABSTRACT

An internal combustion engine employs exhaust gas recompression and fuel injection during the recompression as part of an overall homogeneous charge compression ignition control. In-cylinder fuel reformation is estimated using exhaust gas burned gas fractions determined from sensed exhaust gases and models. Models include air actually consumed in in-cylinder fuel combustion and reforming processes and air required to complete in-cylinder combustion reactions of reformed fuel. Reformed fuel is calculated based on the modeled and measured exhaust gas burned gas fractions.

14 Claims, 3 Drawing Sheets

FUEL REFORMING ESTIMATION IN HCCI ENGINES

TECHNICAL FIELD

The present application claims priority benefit from U.S. Provisional Patent Application No. 60/724,191 filed Oct. 6, 2005, titled "FUEL REFORMING ESTIMATION IN HCCI ENGINES", which is hereby incorporated herein by reference.

TECHNICAL FIELD

The present invention is related to homogeneous charge compression ignition engines. More particularly, the invention relates to pre-injection fuel reformation in homogeneous charge compression ignition (HCCI) engines.

BACKGROUND OF THE INVENTION

Auto-ignited combustion in an HCCI engine depends strongly on the temperature, composition and pressure of the cylinder charge at intake valve closing. Hence, in order to achieve robust auto-ignited combustion, the inputs to the engine, such as the amount of fuel, fuel injection timing and intake/exhaust valve timings must be carefully coordinated to ensure that states of cylinder charge are within desired ranges.

Operating an HCCI engine using exhaust recompression strategy to control the cylinder charge temperature involves trapping the hot exhaust gas from the previous engine cycle by closing the exhaust valve early during the exhaust stroke and opening the intake valve at a late timing symmetrical to the exhaust valve closing timing. The cylinder charge composition and temperature will depend on how early the exhaust valve closes before the top dead center. If the exhaust valve closes earlier, a greater amount of hot exhaust gas from the previous engine cycle is trapped in the cylinder, leaving less cylinder volume for the fresh air mass, thereby increasing the cylinder temperature and decreasing the cylinder oxygen concentration. In the exhaust recompression strategy, the relationship between exhaust valve closing timing and intake valve opening timing is characterized by a "negative" valve overlap (as opposed to the typical positive valve overlap in a conventional internal combustion engine). The negative valve overlap (NVO) is defined as the duration in crank angle between exhaust valve closing and intake valve opening.

In addition to the valve strategy, a suitable fuel injection strategy must be used to achieve auto-ignited combustion for a wide-range of engine loads. For example, at a low engine load (for example, fueling rate <7 mg/cycle at 1000 rpm), the cylinder charge may not be hot enough for a stable auto-ignited combustion in spite of the highest practical value of NVO being used, leading to a partial-burn or misfire. One way to increase the charge temperature is to pre-inject a small amount of fuel near intake TDC (Top-Dead-Center) during the recompression. A part of the pre-injected fuel will reform due to the high pressure and temperature during the recompression, and the heat energy released from fuel-reforming will help increase the cylinder charge temperature enough for a successful auto-ignited combustion following the main fuel injection event. The amount of pre-injected fuel that reforms during the recompression depends on many variables such as injected mass, injection timing and trapped exhaust gas temperature and pressure.

It is desirable to precisely estimate and control the amount of fuel reforming because excessive fuel reforming decreases the fuel economy, while lack of fuel reforming may result in combustion instability.

However, it remains a significant challenge to estimate the amount of fuel that reforms during the recompression since fuel reformation depends on many variables such as injected mass, injection timing, and trapped exhaust gas temperature and pressure. In a HCCI engine, although one may use a cylinder pressure sensor to measure the combustion phasing and qualitatively relate it to the amount of fuel reforming, it is very difficult to isolate the effect of fuel reforming on combustion phasing from other engine variables. Furthermore, in-cylinder pressure sensing technologies are costly.

Therefore, what is needed is a robust and cost effective technique to determine the amount of fuel reformation in a HCCI engine employing exhaust gas recompression and fuel injection during exhaust gas recompression.

SUMMARY OF THE INVENTION

In the present invention, an observer is provided to estimate the amount of fuel reforming in an HCCI engine with exhaust recompression strategy using the measurement from a Universal Exhaust Gas Oxygen (UEGO) sensor (a/k/a wide range O2 sensor, wide range A/F sensor, linear O2 sensor, etc.). The estimated quantity of fuel reforming can then be incorporated in controlling the auto-ignited combustion in an HCCI engine.

An internal combustion engine employs exhaust gas recompression and fuel injection during the recompression as part of an overall HCCI control. A method for estimating in-cylinder fuel reformation in such an engine includes calculating a first intake gas burned fraction and a first exhaust gas burned gas fraction based on sensed intake and exhaust gas constituents in the engine exhaust gas stream. A second intake gas burned fraction and a second exhaust gas burned gas fraction are modeled based on air actually consumed in in-cylinder fuel combustion and reforming processes. And, a third intake gas burned fraction and a third exhaust gas burned gas fraction are modeled based on air required to complete in-cylinder combustion reactions of reformed fuel. Fuel reformed is then calculated based on the first, second and third intake and exhaust gas burned gas fractions.

These and other aspects of the invention will become apparent to those skilled in the art upon reading and understanding the following detailed description of the exemplary embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DESCRIPTION OF THE PREFERRED EMBODIMENT

Figure 1:
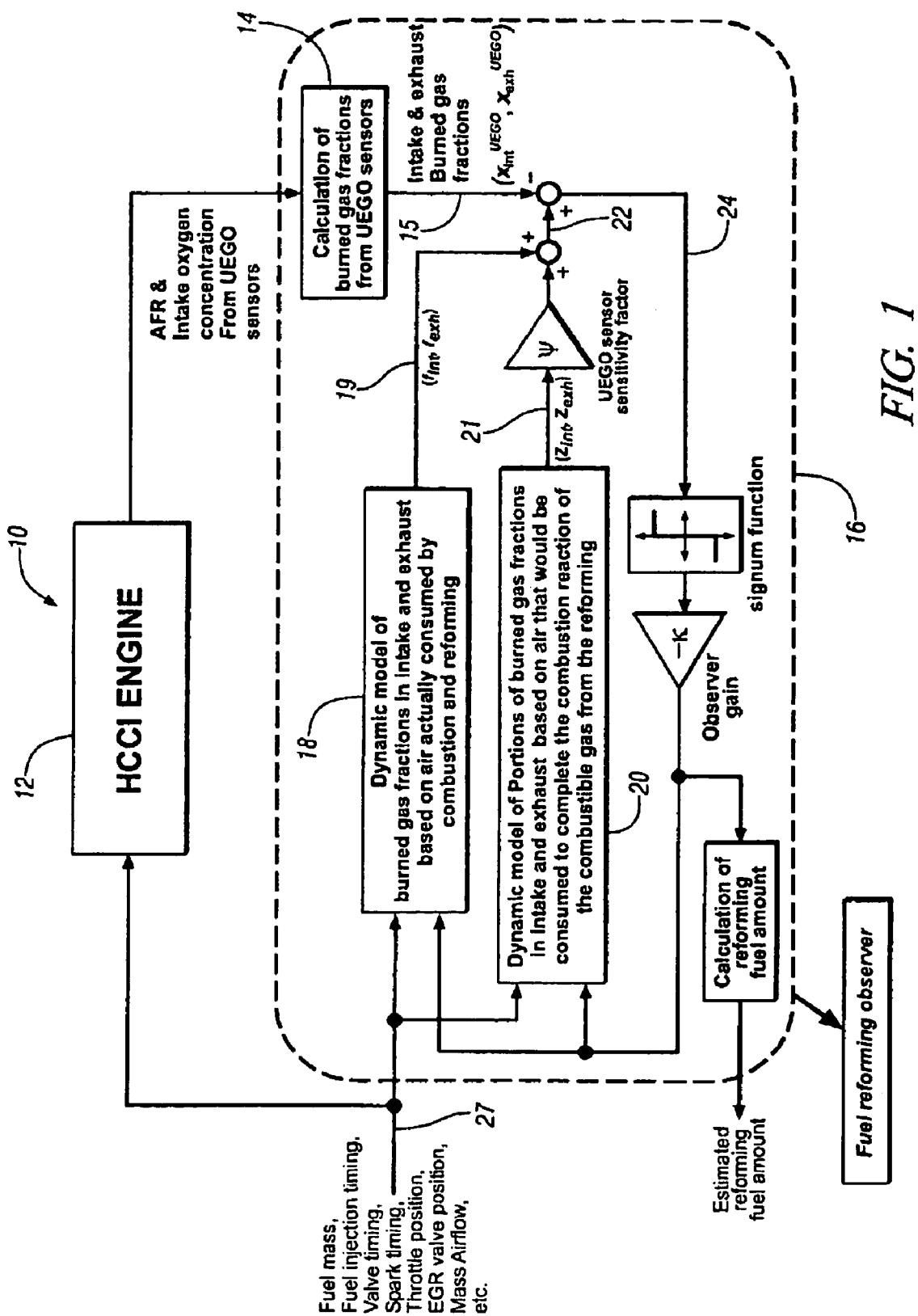
FIG. 1 is a block diagram of a sliding mode observer in accordance with the present invention.

Referring now to FIG. 1, numeral 10 generally indicates a block diagram showing an engine 12 capable of operating with homogeneous charge compression ignition (HCCI) and a combustion control system.

The engine 12 may include various features, devices, actuators and sensors not shown, including power producing combustion chambers (which may be in cylinders with reciprocating pistons) connected with an intake air system and an exhaust system, UEGO sensors, intake and exhaust valves with some form of variable valve timing operative to control fluid intake to and exhaust flow from the combustion chambers, an external exhaust recirculation system including an EGR valve connected between the intake and exhaust systems, and fuel injection and spark ignition systems for supplying fuel to and igniting or assisting ignition of combustible mixtures in the combustion chambers.

The engine 12 is preferably monitored and controlled by an electronic controller (not separately illustrated) containing machine-executable code operable to sense one or more operating parameters, and control actuators to effect proper operation of the engine, in response to operator inputs and predetermined calibrations and controls. The controller is preferably an electronic control module comprised of a central processing unit signally electrically connected to volatile and non-volatile memory devices via data buses. The memory devices preferably include RAM devices, ROM devices, and data buffers. The controller includes an analog-to-digital converter for obtaining signal data, and a plurality of output drivers for controlling a corresponding plurality of output devices, each operable to control an aspect of engine operation. The controller is attached to sensing devices and output devices via wiring harnesses, to monitor and control engine operation. Typical output devices include subsystems necessary for proper control and operation of the engine, including, by way of example, the aforementioned intake air system and exhaust system, intake and exhaust variable valve timing system, external exhaust recirculation system, fuel injection system and spark ignition system. Control algorithms may be executed during preset loop cycles so each control algorithm is executed at least once each loop cycle. Loop cycles are typically executed each 3, 6, 15, 25 and 100 milliseconds during engine operation. Other algorithms may be executed in response to some form of interrupt signal sent to the controller from one of the external sensors. Use of electronic controllers, having various control algorithms and calibrations, to control operation of the internal combustion engine is well known to one skilled in the art.

The engine 12 is designed to operate on fuel injected gasoline or similar blends, unthrottled with HCCI combustion over an extended range of engine speeds and loads, which may include engine starting where possible. However spark ignition and throttle controlled operation may be utilized with conventional or modified control methods under conditions not conducive to HCCI operation and to obtain maximum engine power. Direct cylinder injection is used. Widely available grades of gasoline and light ethanol blends thereof are preferred fuels; however, alternative liquid and gaseous fuels such as higher ethanol blends (e.g. E80, E85), neat ethanol (E99), neat methanol (M 100), natural gas, hydrogen, biogas, various reformates, syngases etc. may also be used in the implementation of the present invention.

The controller generates proper inputs to the engine, such as spark timing where spark assist is required, fuel mass, injection timing, throttle position, EGR valve position and negative valve overlap. The controller is adapted to receive input signals from an operator control (e.g. throttle pedal position), indicating the desired engine output, and from sensors indicating engine RPM, intake air temperature, coolant temperature and ambient conditions. The controller functions to determine from lookup tables the instantaneous settings for spark timing, when needed, EGR valve set point, valve timing and fuel injection timing and calculates the burned gas fractions in the intake and exhaust systems as shown at block 14. Block 14 receives input from UEGO sensors disposed in the intake and exhaust manifolds and calculates from the measured intake oxygen concentration and exhaust air-fuel (AF) ratio the exhaust and intake burned gas fractions 15. The control is designed based on extensive calibrations to ensure a successful HCCI combustion under steady state operating conditions. Burned gas fractions from block 14 may also be utilized in a feedback control block (not separately illustrated) for more robust results since combustion phasing may suffer from disturbances and/or environmental changes. Disturbances include, for example, significant or rapid changes in engine speed and load, which are necessary occurrences in vehicle engine operation.

The output of UEGO sensor, pumping current $I_p$, can be expressed as a sum of two current components as follows.

$$I_p = I_p^{lean} + I_p^{rich} \tag{1}$$

where $I_p^{lean}$ is a positive current proportional to the partial pressure of oxygen in the exhaust gas, $I_p^{rich}$ is a negative current proportional to the partial pressures of the combustible gases, e.g., hydrogen and carbon monoxide. Under a normal combustion without fuel reforming, $I_p^{rich}$ can be ignored in a lean combustion condition since the concentrations of hydrogen and carbon monoxide in the exhaust gas are insignificant and $I_p^{rich}$ is approximately equal to zero as a result. On the other hand, the pumping current $I_p$ is approximately equal to $I_p^{rich}$ in a rich combustion condition since oxygen concentration in the exhaust is negligible, resulting in $I_p^{lean}$ approximately equal to zero. Also, it can be equivalently thought that the $I_p^{lean}$ and $I_p^{rich}$ are proportional to the oxygen amount in the exhaust gas and to the oxygen amount required for the complete combustion reaction of combustible gases in the exhaust gas respectively, as shown in the following relationship.

$$CO + \frac{1}{2}O_2 = CO_2 \tag{2}$$

$$H_2 + \frac{1}{2}O_2 = H_2O$$

Thus, under a normal combustion, the pumping current corresponds to the AF ratio in the exhaust gas, i.e., $I_p = I_p^{lean} > 0$, $I_p^{rich} = 0$ under a lean combustion condition, and $I_p = I_p^{rich} < 0$, $I_p^{lean} = 0$ under a rich combustion condition. However, the sensitivities of $I_p^{lean}$ over oxygen concentration and $I_p^{rich}$ over combustible gases are not the same. In fact, it is observed that the sensitivity of $I_p^{lean}$ is about four times less than that of $I_p^{rich}$ around the stoichiometric AF ratio. This is because the diffusion rates of hydrogen, carbon monoxide and oxygen inside the sensor are different. For example, carbon monoxide has a mass very similar to oxygen and so both molecules diffuses equally rapidly through the porous layer of the sensor while hydrogen has a much higher rate of diffusion compared with oxygen. Thus, if in-negligible combustible gases, such as carbon monoxide and hydrogen, exist in a lean combustion condition, $I_p^{rich}$ no longer can be ignored and an excess of oxygen (more than the oxygen that completes combustion reaction of combustible gases due to a higher diffusion rate of hydrogen) is required to compensate the negative current $I_p^{rich}$ owing to the carbon monoxide and hydrogen concentrations in the porous layer, resulting in a lower pumping current $I_p$ than what would be without the combustible gases. The result is that AF ratio reading from the sensor is lower than the true AF ratio in the exhaust gas.

Therefore, the present design of the fuel reforming observer in a HCCI engine is based on the following considerations of auto-thermal fuel reformation and UEGO sensor operation. First, auto-thermal fuel (gasoline) reforming generates a significant amount of hydrogen and carbon dioxide concentrations although some of the hydrogen molecules are later used to deoxidize carbon dioxide into carbon monoxide in an HCCI engine due to the high temperature generated from the main combustion following the fuel reforming. Such auto-thermal fuel reforming may be represented by the following relationship.

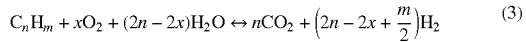

$$C_nH_m + xO_2 + (2n - 2x)H_2O \leftrightarrow nCO_2 + \left(2n - 2x + \frac{m}{2}\right)H_2 \quad (3)$$

The positive pumping current $I_p^{lean}$ is proportional to the oxygen amount existing in the exhaust gas, while the negative pumping current $I_p^{rich}$ is proportional to the oxygen amount required for the complete combustion reaction of combustible gases in the exhaust gas. The pumping current $I_p$, the output of UEGO sensor, is the sum of those two pumping currents.

The sensitivity of $I_p^{rich}$ is about four times higher than that of $I_p^{lean}$. Thus, if combustible gases, such as carbon monoxide and hydrogen, exist in a lean exhaust gas, an excess of the positive pumping current $I_p^{lean}$ is required to compensate the negative pumping current $I_p^{rich}$, resulting in a lower pumping current $I_p$ than what would be without combustible gases. As a result, the AF ratio reading from the sensor is lower than the true AF ratio in the exhaust gas.

In accordance with the present invention, a fuel reforming observer 16 uses intake and exhaust burned gas fraction models 18, 20 to keep track of the actual air (hence, oxygen) amount used in the combustion and reformation and the air amount that would be required to complete the combustion reaction of combustible gases generated from fuel reforming in the recompressed exhaust gas. Mathematical models 18, 20 describe the dynamics of burned gas fractions and are updated based on inputs 27 and corrected based on the error 24 between outputs (intake and exhaust burned gas fractions) from the models and those calculated from the measurement. A weighted sum 22 of these modeled air quantities corresponds to the pumping current $I_p$, and thereby, the AF ratio reading from a UEGO sensor. The burned gas fractions 15 calculated from the intake oxygen concentration and exhaust air/fuel ratio measurements from UEGO sensors located in intake and exhaust manifolds will be used to correct the modeling error and further improve the estimation accuracy. UEGO sensor sensitivity factor, $\psi$, is tunable and required to account for different sensitivity of $I_p^{lean}$ and $I_p^{rich}$. The signum function gives a sign of error signal (+1 or −1), and high observer gain is used to quickly drive the model outputs to the measured outputs.

A typical burned gas fraction model is not directly applicable to an engine with fuel reforming since the model is developed under normal combustion conditions. Thus, in the present invention, the burned gas fraction models have been developed to apply to an engine with fuel reforming. With fuel reforming, the term "burned gas" includes not only the air actually "burned" in the main combustion, but also the air consumed by the fuel reforming process shown in relationship (3) above. Therefore, the burned gas fraction calculated from the typical burned gas fraction model does not correspond to the "true" burned gas fraction with fuel reforming. To capture the dynamics of AF ratio from a UEGO sensor, the burned gas fraction models of the present invention keep track of combustible gases from fuel reforming, or equivalently, the air amount required to complete the combustion reaction of the combustible gases as well as the actual air amount that burns through combustion. Based on the models of the present invention, an observer, e.g. a sliding mode observer, has been designed based on the burned gas fraction model and the measured burned gas fraction from a UEGO sensor. It is assumed that the mass airflow and a total amount of fuel injected into the cylinder are known such as from sensed and calculated control quantities. Also, in case the engine is operating with an external EGR, it is assumed that the intake burned gas fraction can be determined through a UEGO sensor located in the intake manifold as described. Furthermore, the estimated amount of reformed fuel and EGR flow can be used to estimate true intake and exhaust burned gas fractions from the observer in real-time. Once the amount of reformed fuel and EGR flow are successfully estimated from the observer, true burned gas fractions also can be estimated by the observer.

The dynamic model of burned gas fractions in intake and exhaust manifolds with fuel reforming can be expressed in the following relationships (4), based on an assumption that the engine is operating under unthrottled conditions, i.e., the mass flow into the cylinder is substantially equal to the sum of mass air flow and EGR flow at any point in time.

$$\dot{f}_{int} = \frac{(f_{exh} - f_{int})W_{EGR} - f_{int}MAF}{m_{int}} \quad (4)$$

$$\dot{f}_{exh} = \frac{(f_{int} - f_{exh})(W_{EGR} + MAF) - f_{exh}W_f +}{m_{exh}} \frac{(1+\lambda_s)(W_f - W_{ref}) + (1+\lambda_{ref})W_{ref}}{m_{exh}}$$

In the above relationships (4): $f_{int}$ and $f_{exh}$ are, respectively, the burned gas fraction in intake manifold and exhaust manifold; MAF, $W_{EGR}$, and $W_f$ represents, respectively, air mass flow through the throttle body, EGR flow, and mass fuel flow into the cylinder; and $M_{int}$ and $m_{exh}$ are, respectively, the mass in intake manifold and exhaust manifold. $W_{ref}$ is a portion of mass fuel flow into the cylinder $W_f$, which reforms during the recompression. $\lambda_s$ is the stoichiometric AF ratio (approximately 14.7 for gasoline), and $\lambda_{ref}$ is the ratio of masses of air and fuel that is required to complete the fuel reforming process. For example, if fuel is gasoline ($C_8H_{18}$) and only oxygen participates in the reforming process, theoretical $\lambda_{ref}$ would be approximately 9.6.

To keep track of the air amount required to complete the combustion reaction of the combustible gas from the reforming, additional mass fractions dynamics in intake and exhaust manifolds is also considered substantially as set forth in the relationships (5) below.

$$\dot{\zeta}_{int} = \frac{(\zeta_{exh} - \zeta_{int})W_{EGR} - \zeta_{int}MAF}{m_{int}} \qquad (5)$$

$$\dot{\zeta}_{exh} = \frac{(\zeta_{int} - \zeta_{exh})(W_{EGR} + MAF) - \zeta_{exh}W_f + (\lambda_s - \lambda_{ref})W_{ref}}{m_{exh}}$$

where $\zeta_{int}$ and $\zeta_{exh}$ are, respectively, the mass fraction in intake manifold and exhaust manifold corresponding to the air amount that would complete the combustion reaction of the combustible gas from the fuel reforming.

The exhaust burned gas fraction calculated from the AF ratio reading from a UEGO sensor is approximated as set forth in the following relationship (6).

$$\chi_{exh} = \frac{1 + \lambda_s}{1 + \lambda_{UEGO}} \approx f_{exh} + \varphi \times \zeta_{exh} \qquad (6)$$

where $\chi_{exh}$ is the exhaust burned gas fraction calculated from measured AF ratio, $\lambda_{UEGO}$ is the AF ratio measured from a UEGO sensor, $\phi$ is a constant to account for different sensitivities of a UEGO sensor against the actual air amount and the air amount required for complete combustion reaction of the combustible gas. In the present example, $\phi$ is set to 4 based on a simple linear approximation of the sensor characteristic and the discussions previously set forth herein above.

The sliding mode observer is designed based on the burned gas fraction model as set forth above. It is assumed that mass airflow (MAF) is measured, and a total amount of fuel injected into the cylinder ($W_f$) is known. Also, in case the engine is operating with an external EGR, it is assumed that the intake burned gas fraction is measured through an additional linear oxygen sensor located in the intake manifold. In this case, the intake burned gas fraction can be calculated from the measured intake oxygen concentration using Dalton's law.

To design a sliding mode observer, the relationships (4) and (5) are re-arranged by changing coordinates as follows:

$$\dot{\chi}_{int} = \frac{(\chi_{exh} - \chi_{int})W_{EGR} - \chi_{int}MAF}{m_{int}} \qquad (7)$$

$$\dot{\chi}_{exh} = \frac{(\chi_{int} - \chi_{exh})(W_{EGR} + MAF) - \chi_{exh}W_f + (1 + \lambda_s)W_f + (\varphi - 1)(\lambda_s - \lambda_{ref})W_{ref}}{m_{exh}}$$

where $\chi_{int}$ ($=f_{int}+\phi\zeta_{int}$) and $\chi_{exh}$ ($=f_{exh}+\phi\zeta_{exh}$) are, respectively, the intake and exhaust burned gas fractions calculated from an intake linear oxygen sensor and an exhaust UEGO sensor. Then, a sliding mode observer is designed based on the model as follows, based on assumption that masses of intake and exhaust manifolds are known.

$$\dot{\hat{\chi}}_{int} = \frac{-\hat{\chi}_{int}MAF}{m_{int}} + k_1 \frac{1}{m_{int}} sgn(\chi_{int} - \hat{\chi}_{int}) \qquad (8)$$

$$\dot{\hat{\chi}}_{exh} = \frac{(\hat{\chi}_{int} - \hat{\chi}_{exh})MAF - \hat{\chi}_{exh}W_f + (1 + \lambda_s)W_f}{m_{exh}} -$$

-continued $$k_1 \frac{1}{m_{exh}} sgn(\chi_{int} - \hat{\chi}_{int}) + k_2 \frac{1}{m_{exh}} sgn(\chi_{exh} - \hat{\chi}_{exh})$$

The observer error dynamics can be described in the following relationships (9):

$$\dot{e}_{int} = \frac{-e_{int}MAF}{m_{int}} + \frac{(\chi_{exh} - \chi_{int})W_{EGR}}{m_{int}} - k_1 \frac{1}{m_{int}} sgn(e_{int}) \qquad (9)$$

$$\dot{e}_{exh} = \frac{(e_{int} - e_{exh})MAF - e_{exh}W_f}{m_{exh}} + \frac{(\chi_{int} - \chi_{exh})W_{EGR}}{m_{exh}} +$$

$$\frac{(\varphi - 1)(\lambda_s - \lambda_{ref})W_{ref}}{m_{exh}} + k_1 \frac{1}{m_{exh}} sgn(e_{int}) - k_2 \frac{1}{m_{exh}} sgn(e_{exh})$$

where $e_{int} = \chi_{int} - \hat{\chi}_{int}$ and $e_{exh} = \chi_{exh} - \hat{\chi}_{exh}$. To derive the sliding mode condition, the following Lyapunov function is considered.

$$V = \frac{1}{2}(e_{int}^2 + e_{exh}^2) \qquad (10)$$

By differentiating V and using the relationships (9), the following relationship (11) is developed:

$$\dot{V} = e_{int}\dot{e}_{int} + e_{exh}\dot{e}_{exh} \qquad (11)$$

$$= -\frac{e_{int}^2 MAF}{m_{int}} - \frac{e_{exh}^2(MAF + W_f)}{m_{exh}} +$$

$$e_{int}\left(\frac{(\chi_{exh} - \chi_{int})W_{EGR} - k_1 sgn(e_{int})}{m_{int}}\right) +$$

$$e_{exh}\left(\frac{e_{int}MAF + (\varphi - 1)(\lambda_s - \lambda_{ref})W_{ref} - k_2 sgn(e_{exh}) + d}{m_{exh}}\right)$$

where $$d = (\chi_{int} - \chi_{exh})W_{EGR} + k_1 sgn(e_{int}). \qquad (12)$$

The sliding gain $k_1$ is designed in accordance with the following relationship to achieve $\eta$-reachability condition, i.e., $e_{int}\dot{e}_{int} < -\eta_1|e_{int}|$, $\eta_1 > 0$:

$$k_1 \geq |(\chi_{int} - \chi_{exh})W_{EGR}|_{max} + \eta_1 \qquad (13)$$

where $\|_{max}$ is the upper bound of absolute value. With the sliding gain (12), it is guaranteed that $e_{int} \to 0$ with a bound on the time $t_{\eta_1}$ given by the relationship (18).

$$t_{\eta_1} \leq \frac{e_{int}(0)}{\eta_1} \qquad (14)$$

Also, when $e_{int} = 0$, the average value of $\dot{e}_{int}$ is equal to zero, which yields the following relationship.

$$k_1 sgn(e_{int}) = (\chi_{exh} - \chi_{int})W_{EGR} \qquad (15)$$

Since d term in relationship (12) is bounded and vanishes as $e_{int} \to 0$ by (15), the sliding gain $k_2$ can be designed to achieve the relationship (11) to be negative definite as follows:

$$k_2 \geq |e_{int}MAF + (\varphi - 1)(\lambda_s - \lambda_{ref})W_{ref} + d|_{max} + \eta_2 \qquad (16)$$

where $\eta_2>0$. Since the sliding gain $k_2$ also achieves $\eta$-reachability condition, it is guaranteed that $e_{exh} \to 0$ within a finite time.

The conditions (13) and (14) guarantee that the sliding surface $V=0$ will be reached in a finite time. Also, since $e_{int}$, $e_{exh}$, and the average value of $\dot{e}_{int}$, $\dot{e}_{exh}$ are equal to zero on the sliding surface, the following relationship is obtained once the sliding surface is reached.

$$k_2 \text{sgn}(e_{exh}) = (\phi-1)(\lambda_s - \lambda_{ref})W_{ref} \quad (17)$$

Then based on (17), the amount of reformed fuel can be estimated by low-pass filtering the following quantity.

$$\hat{W}_{ref} = \frac{k_2 \text{sgn}(e_{exh})}{(\varphi-1)(\lambda_s - \lambda_{ref})} \quad (18)$$

Similarly, the EGR flow $W_{EGR}$ can be estimated by low-pass filtering the following quantity based on (15) and the estimated intake and exhaust burned gas fractions.

$$\hat{W}_{EGR} = \frac{k_1 \text{sgn}(e_{int})}{(\hat{\chi}_{exh} - \hat{\chi}_{int})} \quad (19)$$

As an example and with further reference to FIGS. 2A-2E, a sliding mode observer was designed and the experimental data taken from a single-cylinder HCCI engine operating with a constant speed at 1000 rpm were used to validate the observer. To apply the sliding mode observer, masses of intake and exhaust manifolds are calculated from the ideal gas law based on the volumes and measured temperatures and pressures at intake and exhaust manifolds. In the example shown below, the amount of fuel injection is calculated from a calibration table as a function of the fuel pulse width. To compensate possible errors in fuel injection, an additional adaptive system may be incorporated to correct the calibration table using the measured mass airflow and AF ratio during normal combustion conditions.

Figure 2A:
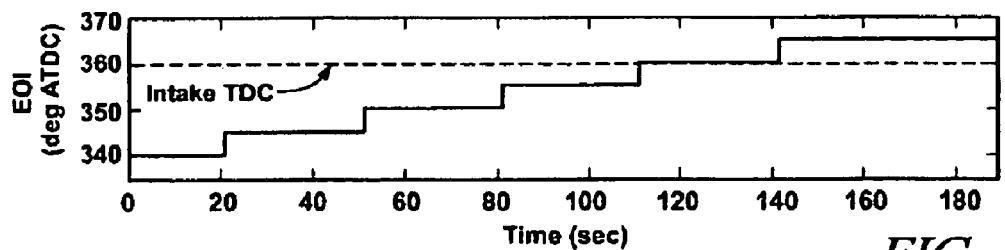
FIG. 2A is a plot of controlled step changes in end of injection (EOI) timing of a fueling event in accordance with the present invention.
Figure 2B:
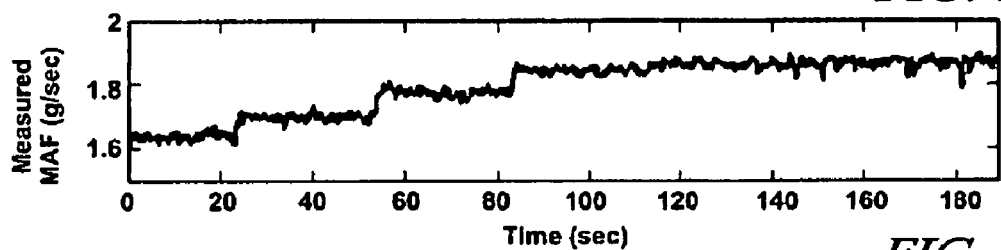
FIGS. 2B-2E are plots of the sliding mode observer results with EOI step changes as illustrated in FIG. 2A in accordance with the present invention.
Figure 2C:
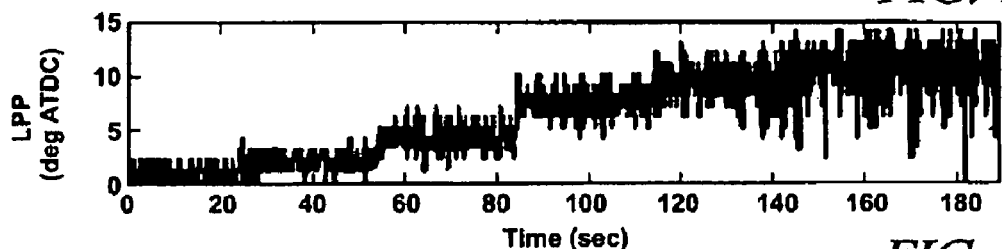
Figure 2D:
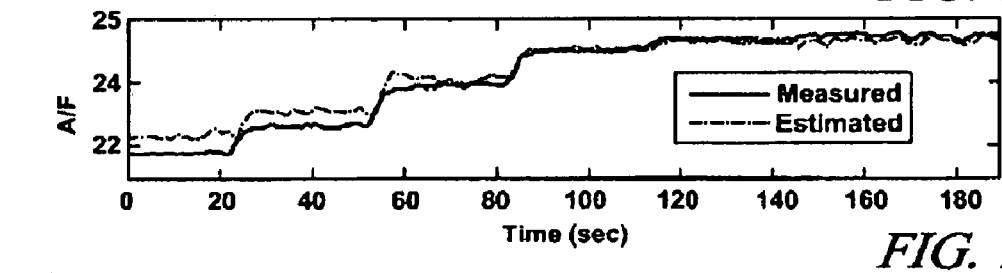
Figure 2E:
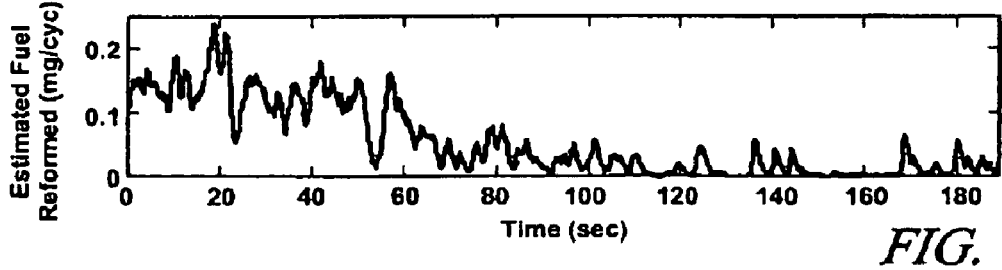
Figure 3:
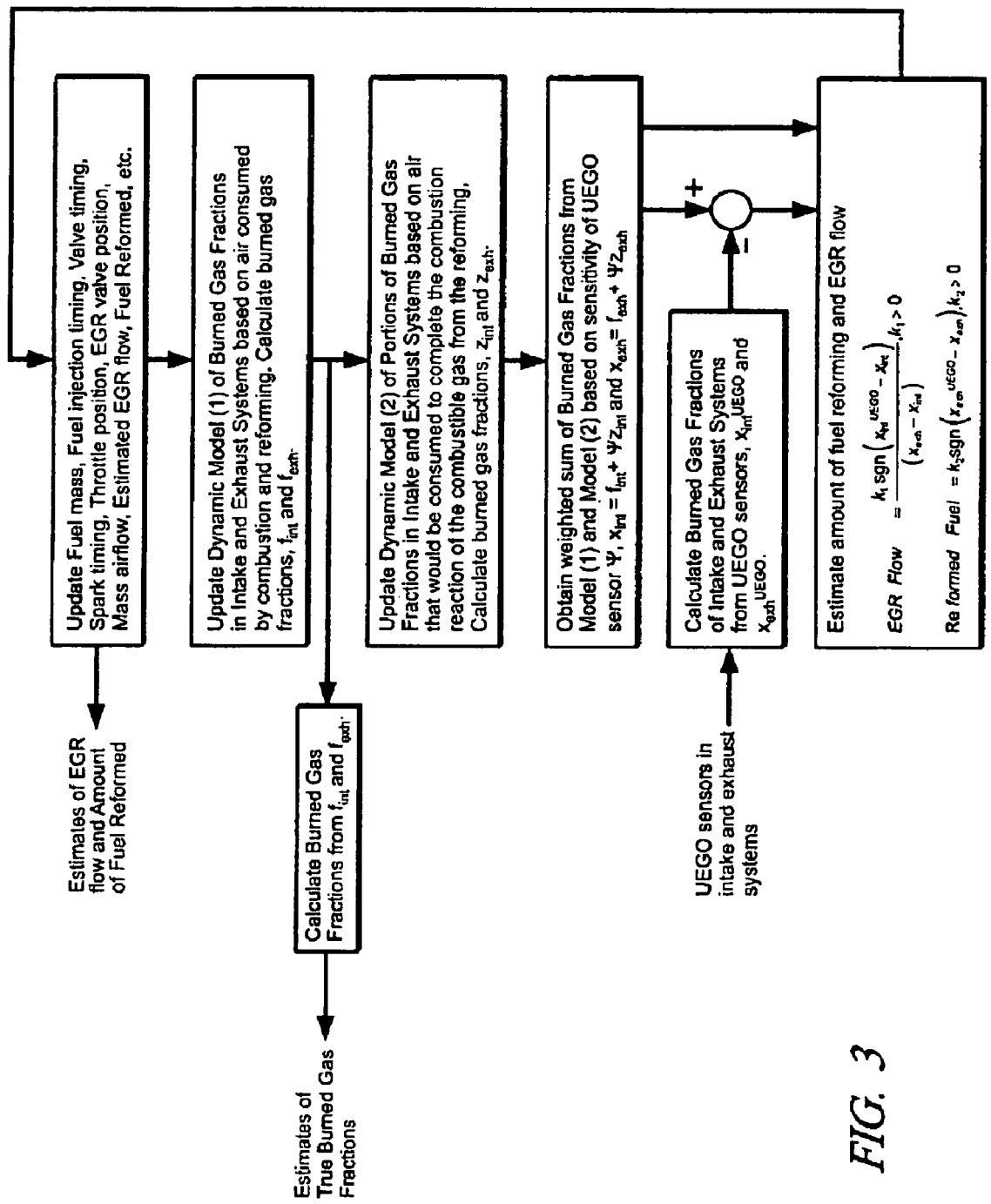
FIG. 3 is a flow chart representing the sliding mode observer corresponding to FIG. 1 in accordance with the present invention.

In the experiment, the fuel mass was injected once per cycle (i.e., single injection) around the intake TDC, and fuel injection timing was the only factor changed while all other inputs remained constant. The fueling rate was fixed at 9 mg/cycle, the negative valve overlap set to 140 deg with no external EGR, and the end of injection (EOI) varied from 340 to 365 deg ATDC as shown along the time scale of the plots. FIGS. 2A-2E illustrate that with an early injection (340 deg ATDC), a portion of the injected fuel reforms during recompression due to the high pressure and temperature that peak around the intake TDC. The location of peak pressure (LPP) advances due to the heat released from fuel reforming. The estimated fuel reformed is about 0.2 mg/cycle at the injection timing of 340 deg ATDC and decreases to almost zero as the injection timing retards. Although no direct measurement of the fuel mass that reforms in the combustion chamber is available, the amount estimated is close to the amount that is calculated from the heat release analysis with cylinder pressure measurements. FIG. 2D also shows the estimated "true" AF ratio based on the model running in parallel to the sliding mode observer. It shows that at the injection timing of 340 deg ATDC, the estimated "true" A/F ratio is about 0.5 higher than the measured A/F ratio (using a UEGO sensor). The estimated true AF ratio eventually converges to the measured AF ratio as the injection timing further retards and fuel reforming no longer occurs The invention has been described with specific reference to a preferred embodiment thereof. Further modifications and alterations may occur to others upon reading and understanding the specification. The invention is intended to include all such modifications and alterations insofar as they come within the scope of the invention.

The invention claimed is:

1. Method for estimating fuel reformation in an internal combustion engine employing exhaust gas recompression valve control and fuel injection during exhaust gas recompression comprising:
    calculating a first exhaust gas burned gas fraction based on at least one linear oxygen sensor disposed in the exhaust gas stream;
    modeling a second exhaust gas burned gas fraction based on air actually consumed in in-cylinder fuel combustion and reforming processes;
    modeling a third exhaust gas burned gas fraction based on air required to complete in-cylinder combustion reactions of reformed fuel; and
    calculating fuel reformed based on the first, second and third exhaust gas burned gas fractions.

2. The method of claim 1 wherein modeling said second and third exhaust gas burned gas fractions comprises correcting said second and third exhaust gas burned gas fractions based on an error factor between the calculated exhaust gas burned gas fraction and a weighted sum of the second and third modeled exhaust gas burned gas fractions.

3. The method of claim 2 wherein the modeled exhaust gas burned gas fractions are weighted to account for linear oxygen sensor sensitivity differential in the presence of combustible gases.

4. The method of claim 1 further comprising:
    calculating a first intake gas burned gas fraction based on at least one linear oxygen sensor disposed in the intake gas stream;
    modeling a second intake gas burned gas fraction based on air actually consumed in in-cylinder fuel combustion and reforming processes;
    modeling a third intake gas burned gas fraction based on air required to complete in-cylinder combustion reactions of reformed fuel; and
    calculating fuel reformed based on the first, second and third exhaust gas burned gas fractions and the first, second and third intake gas burned gas fractions.

5. The method of claim 4 wherein modeling said second and third intake and exhaust gas burned gas fractions comprises correcting said second and third intake and exhaust gas burned gas fractions based on error factors between the calculated intake and exhaust gas burned gas fractions and a weighted sums of the second and third modeled intake and exhaust gas burned gas fractions.

6. The method of claim 5 wherein the modeled intake and exhaust gas burned gas fractions are weighted to account for linear oxygen sensor sensitivity differential in the presence of combustible gases.

7. Method for estimating fuel reformation in an internal combustion engine employing exhaust gas recompression valve control and fuel injection during exhaust gas recompression comprising:
    calculating first burned gas fractions for intake and exhaust gases based on at least one linear oxygen sensor disposed in each of the intake and exhaust gas streams;

modeling second burned gas fractions for intake and exhaust gases; and calculating fuel reformed based on the first and second burned gas fractions.

8. The method of claim 7 wherein modeling second burned gas fractions comprises:

modeling third burned gas fractions based on air actually consumed in in-cylinder fuel combustion and reforming processes; and modeling fourth burned gas fractions based on air required to complete in-cylinder combustion reactions of reformed fuel.

9. The method of claim 8 wherein modeling second burned gas fractions further comprises:

weighting the third and fourth burned gas fractions to account for sensor sensitivity differential in the presence of combustible gases; and summing the weighted third and fourth burned gas fractions.

10. Method for estimating fuel reformation in an internal combustion engine employing exhaust gas recompression valve control and fuel injection during exhaust gas recompression comprising:

calculating a first intake gas burned gas fraction and a first exhaust gas burned gas fraction based on sensed exhaust gas constituents in the engine intake and exhaust gas streams, respectively;

modeling a second intake gas burned gas fraction and a second exhaust gas burned gas fraction based on air actually consumed in in-cylinder fuel combustion and reforming processes;

modeling a third intake gas burned gas fraction and a third exhaust gas burned gas fraction based on air required to complete in-cylinder combustion reactions of reformed fuel; and calculating fuel reformed based on the first, second and third intake and exhaust gas burned gas fractions.

11. The method of claim 10 further comprising:

providing said sensed exhaust gas constituents in the engine intake and exhaust gas streams using respective universal exhaust gas oxygen sensors (UEGO) located in at least one intake and at least one exhaust manifold of the internal combustion engine.

12. The method of claim 11, further comprising:

determining an error factor between the calculated burned gas fractions and a weighted sum of the modeled burned gas fractions.

13. The method of claim 12 wherein the modeled burned gas fractions are weighted to account for UEGO sensitivity differential in the presence of combustible gases.

14. The method of claim 13 wherein modeling said second and third burned gas fractions comprises correcting said second and third burned gas fractions based on said error factor.

* * * * *